(12) United States Patent
Sung

(10) Patent No.: US 10,838,976 B2
(45) Date of Patent: Nov. 17, 2020

(54) PALEO FOSSIL AND SEDIMENTARY STRUCTURE DATA MINING AND DATUM FOR BIOSTRATIGRAPHY

(71) Applicant: Saudi Arabian Oil Company, Dhahran (SA)

(72) Inventor: Roger R. Sung, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 445 days.

(21) Appl. No.: 15/786,203

(22) Filed: Oct. 17, 2017

(65) Prior Publication Data
US 2019/0114352 A1 Apr. 18, 2019

(51) Int. Cl.
| | |
|---|---|
| G01V 1/40 | (2006.01) |
| G06F 16/26 | (2019.01) |
| G01V 1/50 | (2006.01) |
| G06F 16/21 | (2019.01) |
| E21B 47/00 | (2012.01) |

(52) U.S. Cl.
CPC ............ *G06F 16/26* (2019.01); *E21B 47/00* (2013.01); *G01V 1/50* (2013.01); *G06F 16/211* (2019.01); *G06F 2216/03* (2013.01)

(58) Field of Classification Search
None
See application file for complete search history.

(56) References Cited

U.S. PATENT DOCUMENTS

| | | | |
|---|---|---|---|
| 6,754,588 B2 | 6/2004 | Cross et al. | |
| 8,838,428 B2 | 9/2014 | Tapscott et al. | |
| 9,477,010 B2 | 10/2016 | Mallet | |
| 10,422,924 B2* | 9/2019 | Zhang | ........... G01V 9/00 |
| 2006/0161406 A1* | 7/2006 | Kelfoun | ........... E21B 47/022 |
| | | | 703/10 |
| 2013/0140088 A1* | 6/2013 | Williams | ........... E21B 7/04 |
| | | | 175/45 |
| 2013/0144531 A1 | 6/2013 | Johnston | |

(Continued)

OTHER PUBLICATIONS

International Search Report and Written Opinion issued in International Application No. PCT/US2018/055823 dated Jan. 30, 2019, 13 pages.

(Continued)

*Primary Examiner* — Aditya S Bhat
(74) *Attorney, Agent, or Firm* — Fish & Richardson P.C.

(57) ABSTRACT

A dataset is generated in a database using standardized paleo-fossil and sedimentary information. Analytical operations are executed on the generated dataset. A reservoir zone thickness of a stratigraphic zone is determined based on a result of the analytical operations, where the analytical operations determine a starting occurrence and an ending occurrence of a one or more particular paleo-fossils, and where the starting occurrence and ending occurrence is used to define boundaries of the stratigraphic zone and to determine the reservoir zone thickness. A fault and fracture analysis is performed based on a result of the analytical operations. In real-time, at least one action of a hydrocarbon recovery drill is controlled, where control of the at least one action is based upon geological datum and the determined reservoir zone thickness or predictions based on the result of the fault and fracture analysis.

20 Claims, 12 Drawing Sheets
(7 of 12 Drawing Sheet(s) Filed in Color)

(56) References Cited

U.S. PATENT DOCUMENTS

2014/0377873 A1    12/2014   Hay
2015/0219793 A1    8/2015   Li
2016/0018556 A1    1/2016   Montgomery et al.
2016/0169856 A1    6/2016   Sung
2017/0096881 A1    4/2017   Dusterhoft et al.
2017/0167254 A1    6/2017   Fotland

OTHER PUBLICATIONS

GCC Examination Report in GCC Appln. No. GC2018-36232, dated Jan. 30, 2020, 4 pages.

* cited by examiner

BU
Burrows

- Bo  BU1  BORINGS
- BU2  HORIZONTAL BURROW
- BU3  VERTICAL BURROW — 202a
- BU4  OBLIQUE BURROW
- BU5  HORIZONTAL SAND INFILLED BURROW
- BU6  VERTICAL SAND INFILLED BURROW
- BU7  OBLIQUE SAND INFILLED BURROW
- BU8  HIGH BURROWING_CHURNED
- BU9  LOW BIOTURBATION
- BU10 OXYGENATED HALOES
- BU11 MODERATE BIOTURBATION
- BU12 VERTICAL SCOLICIA BURROW
- BU13 OBLIQUE SCOLICIA BURROW
- BU14 HORIZONTAL SCOICIA BURROW
- BU15 MOTTLED BURROW

FIG. 2A

B
Bedding

- B1  INCLINED CRUDE BEDDING
- B2  HORIZONTAL PLANAR BEDDING (ANIMATION)
- B3  WAVY BEDDING
- B4  FLASER BEDDING
- B5  LENTICULAR BEDDING
- B6  CONVOLUTE BEDDING
- B7  GRADED BEDDING
- B8  CRUDE PARALLEL BEDDING
- B9  STRATIGRAPHIC BEDDING
- B10 CONTORTED BEDDING — 202b
- B11 INCLINED HETEROLITHIC STRATIGRAPHIC BEDDING
- B12 OVERSTEEPENED BEDDING
- B13 HIGH-ANGLE-PLANAR-BEDDING
- B14 
- B15 HIGH-ANGLE-PLANAR-BEDDING
- B16 LOW-ANGLE-PLANAR-BEDDING
- B17 INVERSE GRADDED BEDDING
- B18 NODULAR BEDDING
- B19 BOUMA SEQUENCE

FIG. 2B

| Start Depth MS | End Depth MS | INTERP_TYP_CD | Sedimentary Texture Code |
|---|---|---|---|
| 12866.99 | 12866.99 | P | F8 |
| 12868.98 | 12868.98 | P | XB3 |
| 12868.99 | 12868.99 | P | XB3 |
| 12872.67 | 12872.67 | P | F8 |
| 12873.89 | 12873.89 | P | F8 |
| 12874.39 | 12874.39 | P | F8 |
| 12878.52 | 12878.52 | P | F7 |
| 12882.85 | 12882.85 | P | XB3 |
| 12882.89 | 12882.89 | P | XB3 |

FIG. 5

PALEO FOSSIL AND SEDIMENTARY STRUCTURE DATA MINING AND DATUM FOR BIOSTRATIGRAPHY

BACKGROUND

Trace microorganism fossils with respect to containing sedimentary structures provide in-situ evidence indicating depositional environment and age. Some fossils (that is, "index" fossils) can form unique bio-indicators to precisely date a geological period, which can be used to determine if hydrocarbon production is likely or even possible. Sedimentologists and geologists often observe and describe these fossils from well core data in a laboratory and from sedimentary formation outcrops in the field. Many of the descriptions made are manual drawings. While valuable, this qualitative interpretation cannot readily contribute to the quantitative analysis in a digital environment.

A development well is drilled in a proven hydrocarbon producing area for the production of oil or gas and drilled to a depth that is likely to be productive, so as to maximize chances of success. In contrast, an exploration well is drilled in the hopes of locating a new source of hydrocarbons and represents a risk for the driller because it is not known whether the well will be productive enough to offset drilling costs. Accordingly, an exploratory well tends to reach unknown/uncertain reservoir zones and geological ages than a development well. Costly well cores are often acquired to verify where a drilling bit is in an exploration well. While some interpretation can be quickly performed on the obtained well core, no digital calibration currently exists to verify the interpretation against. As a result, while drilling an expensive exploration well, the geological period corresponding to a particular position of a drill bit is often not known with accuracy to permit operational decisions to be made regarding the value of the exploration well.

SUMMARY

The present disclosure describes providing paleo-fossil digital calibration for well core interpretations.

In an implementation, a dataset is generated in a database using standardized paleo-fossil and sedimentary information. Analytical operations are executed on the generated dataset. A reservoir zone thickness of a stratigraphic zone is determined based on a result of the analytical operations, where the analytical operations determine a starting occurrence and an ending occurrence of a one or more particular paleo-fossils, and where the starting occurrence and ending occurrence is used to define boundaries of the stratigraphic zone and to determine the reservoir zone thickness. A fault and fracture analysis is performed based on a result of the analytical operations. In real-time, at least one action of a hydrocarbon recovery drill is controlled, where control of the at least one action is based upon geological datum and the determined reservoir zone thickness or predictions based on the result of the fault and fracture analysis.

The previously described implementation is implementable using a computer-implemented method; a non-transitory, computer-readable medium storing computer-readable instructions to perform the computer-implemented method; and a computer-implemented system comprising a computer memory inter-operably coupled with a hardware processor configured to perform the computer-implemented method/ the instructions stored on the non-transitory, computer-readable medium.

The subject matter described in this specification can be implemented in particular implementations, so as to realize one or more of the following advantages. First, the described approach permits digital calibration of performed well core interpretations from exploratory wells. Second, the ability to calibrate well core interpretations from an exploratory well with known geological time periods by using paleo fossils allows a more precise determination of a geological age for a particular well core. Third, having a more precise idea of the geological age of a well core, allows a determination to be made whether hydrocarbon production is likely or even possible in an exploratory well. Accordingly, operational decisions can be made as to whether drilling in the exploratory well should continue or be stopped. Fourth, with the interpretation of a sedimentary structure (such as, fault and fracture), an advanced warning for drilling operations can be generated from the prediction of a drilling mud loss area. Other advantages will be apparent to those of ordinary skill in the art.

The details of one or more implementations of the subject matter of this specification are set forth in the Detailed Description, the Claims, and the accompanying drawings. Other features, aspects, and advantages of the subject matter will become apparent from the Detailed Description, the Claims, and the accompanying drawings.

DESCRIPTION OF DRAWINGS

The patent or application file contains at least one color drawing executed in color. Copies of this patent application publication with color drawings(s) will be provided by the Patent and Trademark Office upon request and payment of the necessary fee.

FIGS. 2A and 2B illustrates subsets of example standardized information for paleo fossil and sedimentary structures, according to an implementation of the present disclosure.

FIG. 5 is a table illustrating an example of a numerical database record representing a sedimentary structure that can be stored in a database as a result of the graphical interpretations illustrated in FIGS. 3 and 4, according to an implementation of the present disclosure.

Like reference numbers and designations in the various drawings indicate like elements.

DETAILED DESCRIPTION

Figure 1:
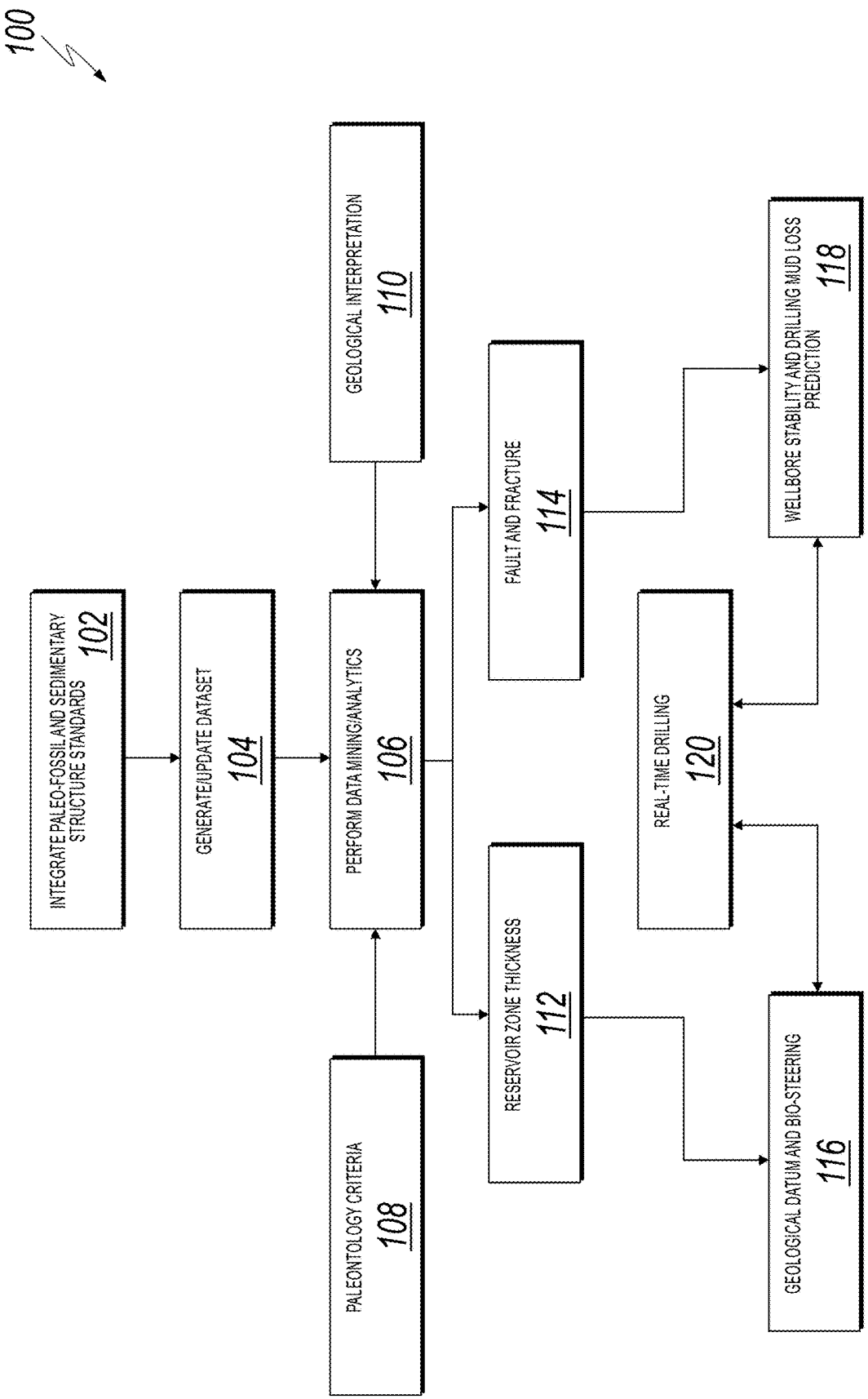
FIG. 1 is a flow chart illustrating an example method for providing paleo-fossil digital calibration for well core interpretations, according to an implementation of the present disclosure.

The following detailed description describes paleo-fossil digital calibration for well core interpretations, and is presented to enable any person skilled in the art to make and use the disclosed subject matter in the context of one or more particular implementations. Various modifications, alterations, and permutations of the disclosed implementations can be made and will be readily apparent to those or ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Trace microorganism fossils (paleo-fossils) with respect to containing sedimentary structures provide in-situ evidence indicating depositional environment and age. The two most common uses of microfossils in petroleum geology are for biostratigraphy and paleoenvironmental analysis. Biostratigraphy is a study of rock unit differentiation based upon contained fossils. Paleoenvironmental analysis is an interpretation of a depositional environment in which a particular rock unit formed, based upon fossils found within the particular rock unit. Some microorganism fossils (that is, "index" fossils such as foraminifera, calcareous nannofossils, and palynomorphs) can form unique bio-indicators to precisely date a geological period and likely locations of deposition of microorganisms that formed the fossils, which can be used to determine if hydrocarbon production is likely or even possible. If fossils of microorganisms known to form particular hydrocarbon deposits (such as, crude oil or natural gas) given a particular geological age and geographic location (such as, a shallow sea basin or river delta) are found when drilling into a sedimentary layer, the likelihood of finding desired hydrocarbon deposits increase. For example, if drilling through multiple sedimentary layers, each with a particular index fossil, eventually results in striking a hydrocarbon deposit in sandstone or reservoir rocks, it is reasonable to assume if a similar well is drilled nearby, that if the same index fossils are discovered in the same order with respect to similar sedimentary layers, that eventually the similar well will also strike a hydrocarbon deposit in sandstone or reservoir rocks.

Sedimentologists and geologists often observe and describe these fossils from well core data in a laboratory and from sedimentary formation outcrops in the field. Many of the descriptions made are manual (for example, paper) drawings made by-hand, as in common in the hydrocarbon-recovery industry. While valuable, these qualitative interpretations cannot readily contribute to quantitative analysis in a digital-type environment.

A development well is drilled in a proven hydrocarbon producing, area for the production of oil or gas and drilled to a depth that is likely to be productive, so as to maximize chances of success. In contrast, an exploration well is drilled in the hopes of locating a new source of hydrocarbons and represents a risk for the driller because it is not known whether the well will be productive enough to offset drilling costs. Accordingly, an exploratory well tends to reach unknown/uncertain reservoir zones and geological ages than a development well. Costly well cores are often acquired to verify where a drilling bit is in an exploration well. While some interpretation can be quickly performed on the obtained well core, no digital calibration currently exists to verify the interpretation against. As a result, while drilling an expensive exploration well, the geological period corresponding to a particular position of a drill bit is often not known with accuracy to permit operational decisions to be made regarding the value of the exploration well.

Described is an approach using big data techniques to provide paleo-fossil digital calibration for well core interpretations. A workflow is introduced to mine standard paleo-fossil and sedimentary structure data and codes, based on specific criteria, in a large database. Relevant data extracted from the database can be analyzed and correlated to derive a unique three-dimensional (3D) areal visualization of a biostratigraphy.

A transformational paradigm shift is occurring in well core interpretation/description. This shift is due, in part, to technologies related to digitization, mobile device/imaging, powerful database processing, and big data/analytics functionality. As a result, the described approach can leverage established standards, for example, drawings, names, and database codes of paelo-fossil and sedimentary structures. Data mining/analytic techniques are described that are based on specific sedimentary theories associated with paleo-fossils incorporated into a database operations (for example, rules, stored procedures, and SQL commands). In some implementations, the described approach can be implemented using distributed computing technologies (for example, cloud-based computing), parallel processing, high-performance computing clusters, or other implementations consistent with this disclosure. The described data mining techniques permit navigation within and extraction of standardized data in a database to derive a biostratigraphy. For example, if occurrence of a particular paleo-fossil dated to 65 million years ago is found in fifty different wells, knowing the well locations and depth of the paleo-fossil, a 3D biostratigraphy of the 65 million-year-old datum can be generated.

Existing and generated core and outcrop descriptions are valuable to provide the previously-described calibration of well core interpretations. However, many non-digital (for example, legacy paper records) descriptions exist. A challenge exists in converting the previous non-digital records to numerical records using digitization and digital core description. For example, objects such as a paleo-fossil in a manual paper drawing can vary, for example, in appearance, size, scale, and orientation since each particular drawing will vary in some way with respect to other drawings (with both the same drafter and between different drafters). In a database environment, objects need to be normalized for optimum database functionality and correlation. Leveraging implemented and agreed-upon paleo-fossil and sedimentary structure standards in drawings and database code is critical to providing well core interpretation calibration functionality. Digital scanning technology and big data analytics can be used to analyze digital scans of existing non-digital records and to transform the digital scans into the agreed-upon standards. For example, an image of a particular manually-drawn paelo-fossil from a particular scanned paper well core interpretation can be visually matched by analytics software and converted into the agreed-upon standards in the database. The standardized big data can be used with digitally-applied bio-datum theory (for example, a set of theoretical rules). The described workflow can then mine paleo-fossil and sedimentary structures in the big data and locate, for example, specific reservoir zones based on paleo-fossil (bio-indicators).

Reservoir zone thickness based on paleo-fossil presence in a particular depth range can also be modeled to guide well planning and real-time drilling. Reservoir zone thickness can also be crosschecked against paleo-fossil identification in an exploration well core to add an insight to steering of well drilling (that is, bio-steering). As a result, multiple wells containing the same reservoir zone identified from data mining can then be correlated. Using the correlation, a unique 3D visualization of the associated biostratigraphy can be created.

In some implementations, the data generated by the described approach can be used to perform real-time drilling. For example, the described approach can be configured to support receiving real-time drilling and other data for processing. Output data can be used to directly control a drilling system in real-time (for example, to stop, start, modify trajectory of, or other operations) related to changing and controlling drilling parameters. In some implementations, geological datum and bio-steering data can be combined with real-time drilling data to make corrections to drilling parameters and direction.

Additionally, sedimentary structure, such as stylolite and fracture can be described and interpreted on a well core to provide a good indication of the presence of a sedimentary fault and fracture. For example, with a large amount of stylolite and fracture data in a database with standard codes and associated well-location and depth, 3D distribution of the fault and fracture can be generated and visualized. The described approach can provide a ground truth calibration to the fault and fracture interpretation traditionally provided following processing of reflected seismic wave signals. Seismic wave processing typically selects breaks in seismic signal continuity and treats the selections as faults. However, breaks can come from many other non-fault factors, (such as, non-functional recording equipment and road noise). As a result, interpretation based on seismic wave processing can be vague and non-conclusive.

FIG. 1 is a flow chart illustrating an example method 100 for providing paleo-fossil digital calibration for well core interpretations, according to an implementation of the present disclosure. For clarity of presentation, the description that follows generally describes method 100 in the context of the other figures in this description. However, it will be understood that method 100 may be performed, for example, by any suitable system, environment, software, and hardware, or a combination of systems, environments, software, and hardware, as appropriate. In some implementations, various steps of method 100 can be run in parallel, in combination, in loops, or in any order.

At 102, standard paleo-fossil and sedimentary information associated with paleo-fossil and sedimentary structures are integrated into applications. For example, applications can include a graphical user interface application permitting digital interpretation of well core data and sedimentary (such as, rock outcrop) data or a database storing observational data points. In some implementations, the standard paleo-fossil and sedimentary information can include drawings (symbols), names, and database codes. From 102, method 100 proceeds to 104.

At 104, a dataset ("big data") is generated/updated using the standard paleo-fossil and sedimentary information. For example, existing non-digital (legacy) data can be digitized and converted for use in the database for data mining and analytics. The database can also include observational data points generated by and consistent with described approach that are natively stored into the database. In some implementations, the generated dataset is continuously updated with data received from multiple data sources, standards updates, or schema changes. From 104, method 100 proceeds to 106.

At 106, data mining/analytics operations are performed on the generated dataset. The data mining/analytics functionality receives one or both of paleontology criteria 108 (for example, rules, stored procedures, or SQL statements that model paleontological theories or understanding) and geological interpretations 110 (for example, geological interpretations received from applications in use by geoscientists to digitally interpret well core, sedimentary, paleo-fossil or other data consistent with this disclosure). In some implementations, the data mining/analytics can mine the dataset with respect to a specific paleo-fossil database code; 2) identify a well name associated with each find (Z); 3) cross-check a well database to provide well X, Y coordinates with a well name of each find; and 4) correlate multiple X,Y,Z records for further analysis. From 106, method 100 proceeds to one or both of 112 and 114.

At 112, reservoir zone thickness can be determined using the data received from the data mining/analytics operations. For example, a specific paleo-fossil may only exist in a specific geological age range. If that time range is known to be rich in oil and gas generation, then the identification of that paleo-fossil is of great interest. Through the interpretation on a well core of a starting occurrence of the specific paleo-fossil at certain depth and an end occurrence of the fossil at some deeper depth, a stratigraphic zone can be identified for particular focus for hydrocarbon recovery. The range reflecting the difference between the start and end depth, based on paleo-fossil interpretation, is considered to be the reservoir zone thickness. Additionally, data from previously-preformed lithology methods can be used to enhance the paleo-based thickness interpretation. From 112, method 100 proceeds to 116.

At 116, reservoir zone thickness can also be crosschecked against paleo-fossil identification and geological datum to add an insight to the steering of well drilling (that is, bio-steering). For example, the trajectory of a drill can be adjusted based on a determined reservoir zone thickness to optimize drilling into a particular area of a reservoir zone. From 116, method 100 proceeds to 120.

At 114, a fault and fracture analysis can be performed using the data received from the data mining/analytics operations. From 114, method 100 proceeds to 118.

At 118, data from the fault and fracture analysis at 118 can be used to predict instability zones of a wellbore before drilling. Additionally, the fault and fracture analysis at 114 can also be used to predict the loss of drilling mud. Drilling mud is recycled within an enclosed wellbore system by bringing up rock chips (from drilling) and removing the rock chips at the well head. Fault and fracture within a reservoir can be visualized as a crack(s) (for example a horizontal crack between or within sedimentary layers). When drill traverses through a fault and fracture without proper knowledge and preventive measures, expensive drilling mud can leak from the wellbore into the crack. Expensive drilling mud must then be continuously added to maintain properly levels for drilling operations, but the drilling mud is also continuously lost. The described methodology can be used to aid in advanced prediction of the presence of fault and fracture in sedimentary layers for drilling purposed, and permit proactive measures to minimize drilling mud loss.

At 120, In some implementations, the geological datum and bio-steering, wellbore stability/drilling mud loss predictions, or a combination of these data types can be used by a drilling engineer, real-time drilling process or computer implemented drilling system, or other operations (whether manual or automated) to make operational decisions related to a well or wells. For example, using the available data, a real-time computer-implemented drilling system to control a hydrocarbon recovery drill (such as, stopping, starting, redirecting, or other action). After 120, method 100 stops.

FIGS. 2A and 2B illustrate subsets 200a and 200b, respectively, of example standardized information for paleo fossil and sedimentary structures, according to an implementation of the present disclosure. With respect to the described approach, it is necessary to establish some type of data standardization for use by applications, the database, or other uses consistent with this disclosure. For example, FIG. 2A illustrates drawings, names, and database codes associated with "BU (Burrows)." Box 202a highlights a standard drawing, name, and database code for a "Vertical Burrow". Similarly, FIG. 2B illustrates information associated with "B (Bedding)." Box 202b highlights a standard drawing, name, and database code for a "Contorted Bedding." As will be appreciated by those of ordinary skill in the art, there are a multitude of other standard drawings, names, and database codes for paleontologically-related and other criteria. FIGS. 2A and 2B have been illustrated to help with understanding of the described concepts and are not meant to limit the disclosure in any way. In some implementations, a full value set of associated drawings, names, and database codes can include over 400 value sets. In some implementations, a value set includes a category, drawing, name, and database code. In other implementations, a value set can include more or less data values consistent with this disclosure.

Figure 3:
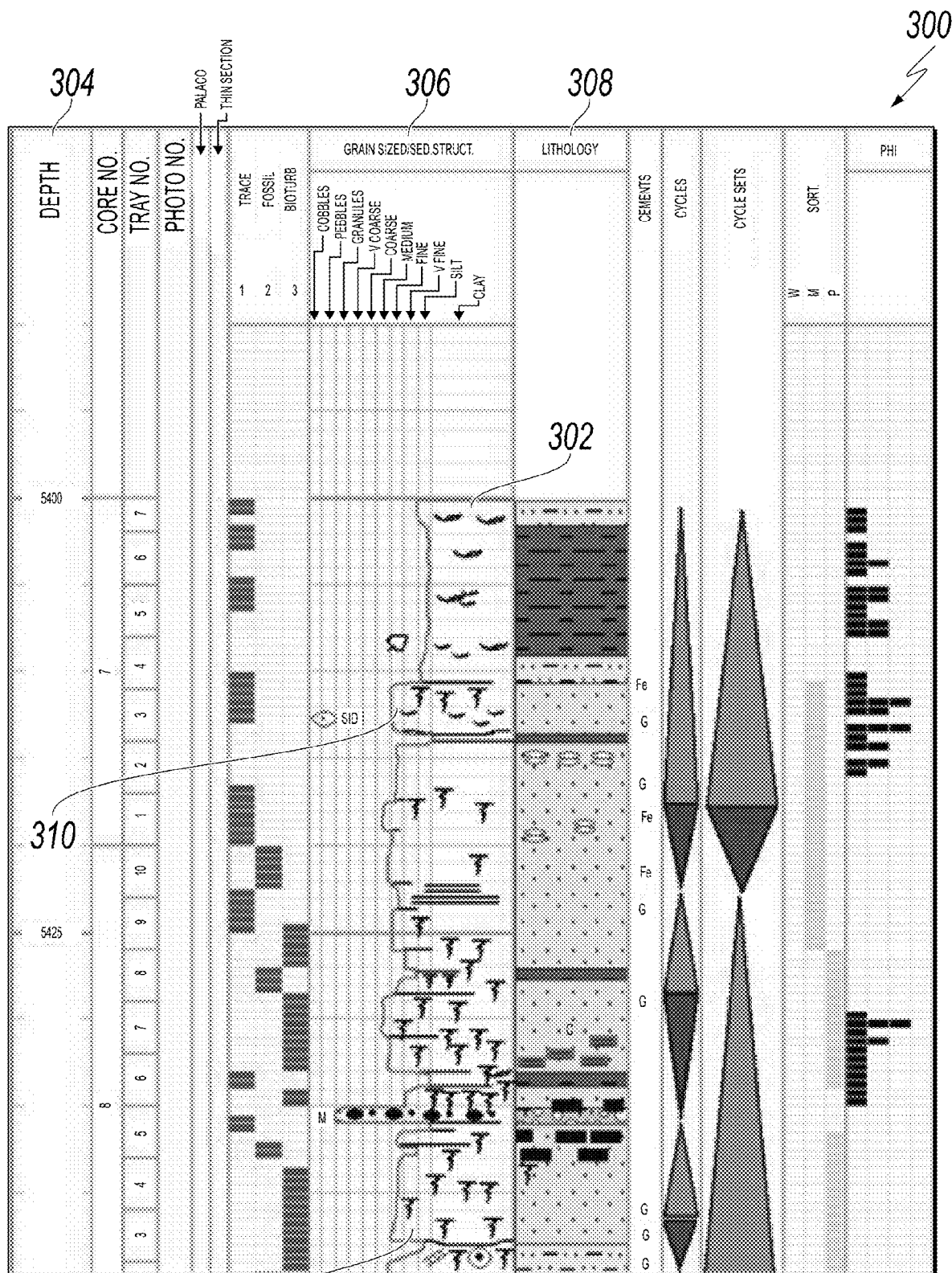
FIG. 3 illustrates a screenshot of a digital application rendering an example core description with respect to paleo-fossil structure, according to an implementation of the present disclosure.

FIG. 3 illustrates a screenshot of a digital application rendering an example core description 300 with respect to paleo-fossil structure, according to an implementation of the present disclosure. As illustrated in FIG. 3, core description 300 includes identified paleo-fossils 302 at a particular depth 304 (here, approximately 5400 feet (ft)). The identified paleo-fossils 302 are rendered in the example core description 300 in the Grain Size/Sed. Structure column 306 and correlated with the Lithology column 308. As will be noticed, at least the symbols and relative amounts for the identified paleo-fossils vary the deeper into the earth one moves. For example, paleo-fossils at 302 are different than those at either 310 or 312. Also paleo-fossils at 302 disappear beyond an approximate depth of 5410 ft in column 306. If the paleo-fossils 302 are of reservoir bearing indication, then a reservoir zone thickness of 10 ft (5400 ft to 5410 ft) can be determined based on a paleo-fossils interpretation. This is consistent with current bio-datum theories regarding ancient microorganisms with respect to hydrocarbon production.

Users are able to select from a standard value set (for example, a standard category, drawing, name, and database code) and drag-and-drop values (for example, a drawing) onto various tracks (for example, column 306 or 308). This functionality permits a user to interpret the core description, but only using data from a standard controlled list which permits the use of big data analytics. In some implementations, users can also be permitted to add custom symbols and annotations to interpretations that can be indicated/requested to be converted into new values to enhance the standard value sets. In these cases, the custom symbols and annotations will not be used by big data analytics until converted into a standardized value set.

Figure 4:
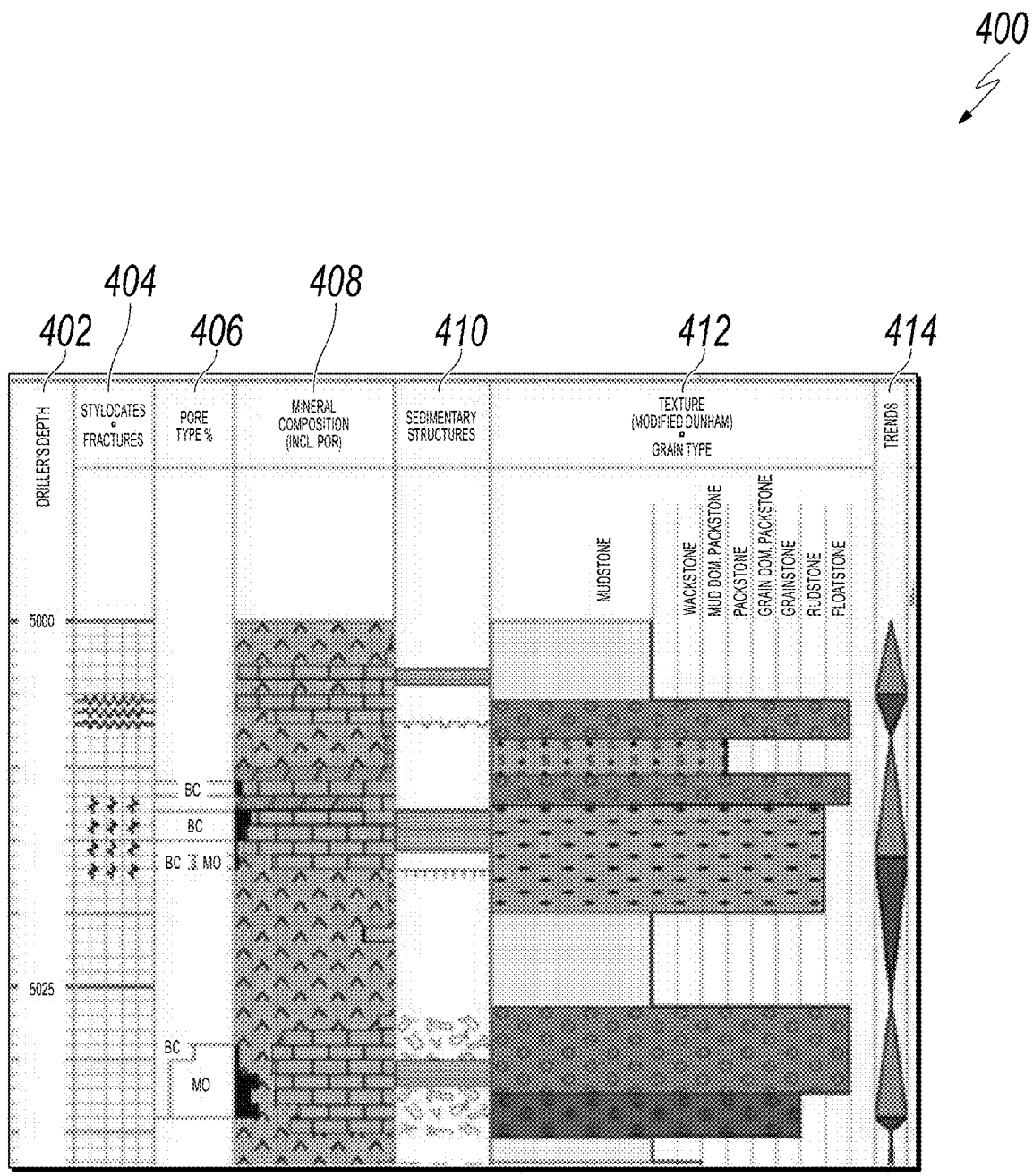
FIG. 4 illustrates a screenshot of a digital application rendering an example core description with respect to sedimentary structure, according to an implementation of the present disclosure.

FIG. 4 illustrates a screenshot of a digital application rendering an example core description 400 with respect to sedimentary structure, according to an implementation of the present disclosure. As illustrated in FIG. 4, core description 400 includes data columns for depth 402, stylolites and fractures 404, pore type 406, mineral composition 408, sedimentary structures 410, texture 412, and trends 414. The presence of stylolites and fractures 404 can give some indication of the presence of fault and fracture.

Similar to FIG. 3, users are able to select from a standard value set (for example, a standard category, drawing, name, and database code) and drag-and-drop values (for example, a drawing) onto various tracks (for example, column 404). This functionality permits a user to interpret the core description, but only using data from a standard controlled list which permits the use of big data analytics. In some implementations, users can also be permitted to add custom symbols and annotations to interpretations that can be indicated/requested to be converted into new values to enhance the standard value sets. In these cases, the custom symbols and annotations will not be used by big data analytics until converted into a standardized value set.

FIG. 5 is a table illustrating an example of a numerical database record representing a sedimentary structure 500 that can be stored in a database as a result of the graphical interpretations shown in FIGS. 3 and 4, according to an implementation of the present disclosure. Reservoir zone thickness is usually interpreted from the reservoir top and base well markers using well logs. For example, given a distinct reservoir zone band. The band thickness varies from places to places. The same reservoir zone usually has the same reservoir rock. Previous lithology-based methods use wireline logs, which have a certain log response to particular rock to interpret data. So from the log behavior, the logs can be interpreted to determine reservoir zone band thickness. Paleo-fossil presence depth ranges are used from big data analytics to provide a unique paleo-based interpretation in addition to the previous lithology-based method. For example, assume that paleontological theory asserts that a certain paleo-fossil exists in a specific reservoir zone period (for example, for several million years). The same family of microorganisms dies throughout that zone period. An occurrence of that specific paleo-fossil should be seen throughout the depth range of that reservoir period. Out of available data (that is, the big data), the shallowest depth and the deepest depth are selected. In between is the reservoir zone thickness from the described paleo-based method. For example, depth range 502 has an interpretive type code ("interpr_type_CD") of "P" ("Primary") and a Sedimentary Texture Code of "XB3," while depth range 504 also has an interpretive type of "P" and a Sedimentary Texture Code of "F8." 502 is an interpretation consistent with FIGS. 3 and 4, and shows at depth 12868.99 ft, an observation of Primary (P) Cross- Bedding XB3 (XB Cross-Bedding category, 3$^{rd}$ in the XB suite). The interpretive type code is based on paleo-fossil interpretations.

Figure 6:
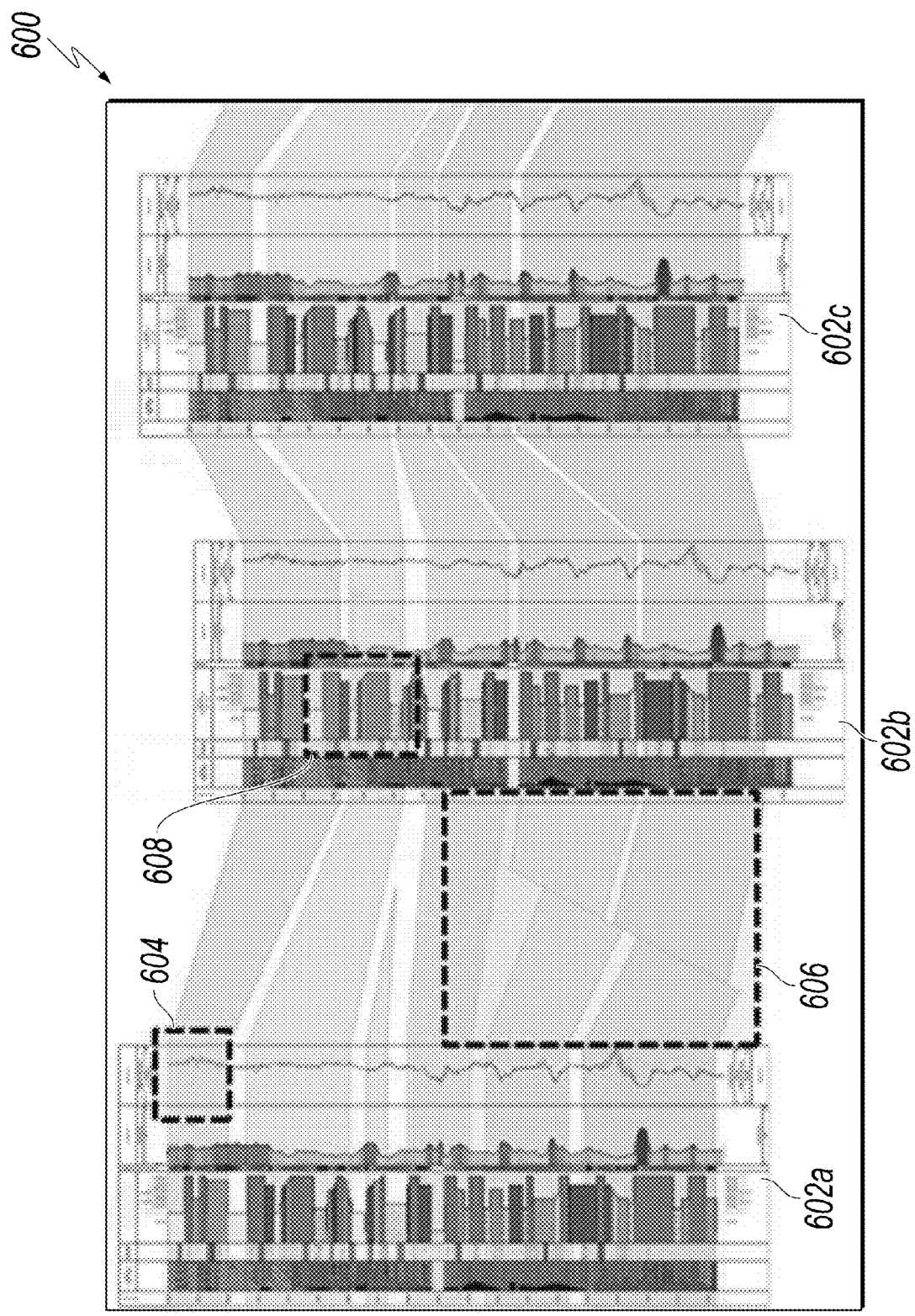
FIG. 6 is an illustration of multiple well correlation with respect to the same sedimentary zone, according to an implementation of the present disclosure.

FIG. 6 is an illustration 600 of multiple well correlation with respect to the same sedimentary zone, according to an implementation of the present disclosure. For example, FIG. 6 illustrates wells 602a, 602b, and 602c (FIGS. 3 and 4 are detailed interpretation examples of a single well, such as 602a, 602b, and 602c). 604 represents a well log along with other interpretations of well 602a. 608 illustrates another detailed interpretation (similar to those in FIGS. 3 and 4) associated with another (different) well 602b. FIG. 6 is similar to FIGS. 3 and 4 in that each well illustrates graphical interpretation displays. FIG. 5 provides underlying numbers of FIGS. 3, 4, and 6, but the numbers lack a graphical link/context that FIG. 6 can provide. As a particular example, between well 602a and well 602b, the interpretation can be analyzed to conclude that some portion is the same reservoir zone. As a result, a correlation is performed between the two wells with drawn lines and colors (606) to represent the interpreted same reservoir zones. Note, the same reservoir zone in well 602b is deeper than in well 602a, so the lines in 606 dip down towards well 602b.

Figure 7:
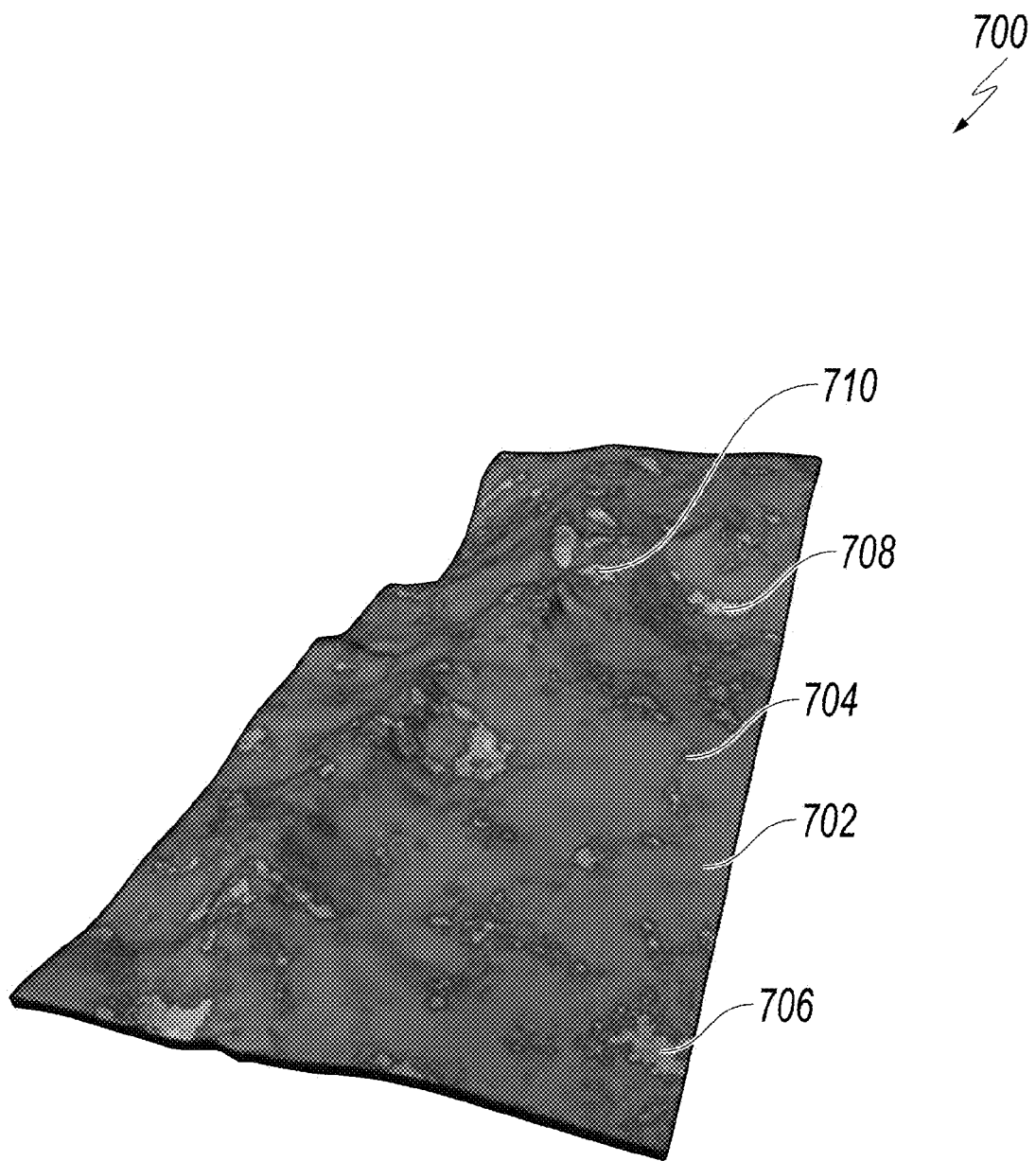
FIG. 7 illustrates an example three-dimensional (3D) model of reservoir zones based on correlated bio-indicator data from FIGS. 5 and 6, according to an implementation of the present disclosure.

FIG. 7 illustrates an example 3D model 700 of reservoir zones based on correlated bio-indicator data from FIGS. 5 and 6, according to an implementation of the present disclosure. For example, FIG. 7 is rendered in a visible color palette where each particular color can represent a different reservoir zone (such as particular colors identified by 702, 704, 706, 708, and 710). In other implementations, the 3D model can be rendered in grayscale, with patterns/hatching, or in some other manner consistent with this disclosure and permitting different reservoir zones to be distinguished. Knowledge of the different reservoir zones, and their corresponding attributes (such as geological location and depth) can be used, for example, for well planning, bio-steering, and real-time drilling operations.

Figure 8:
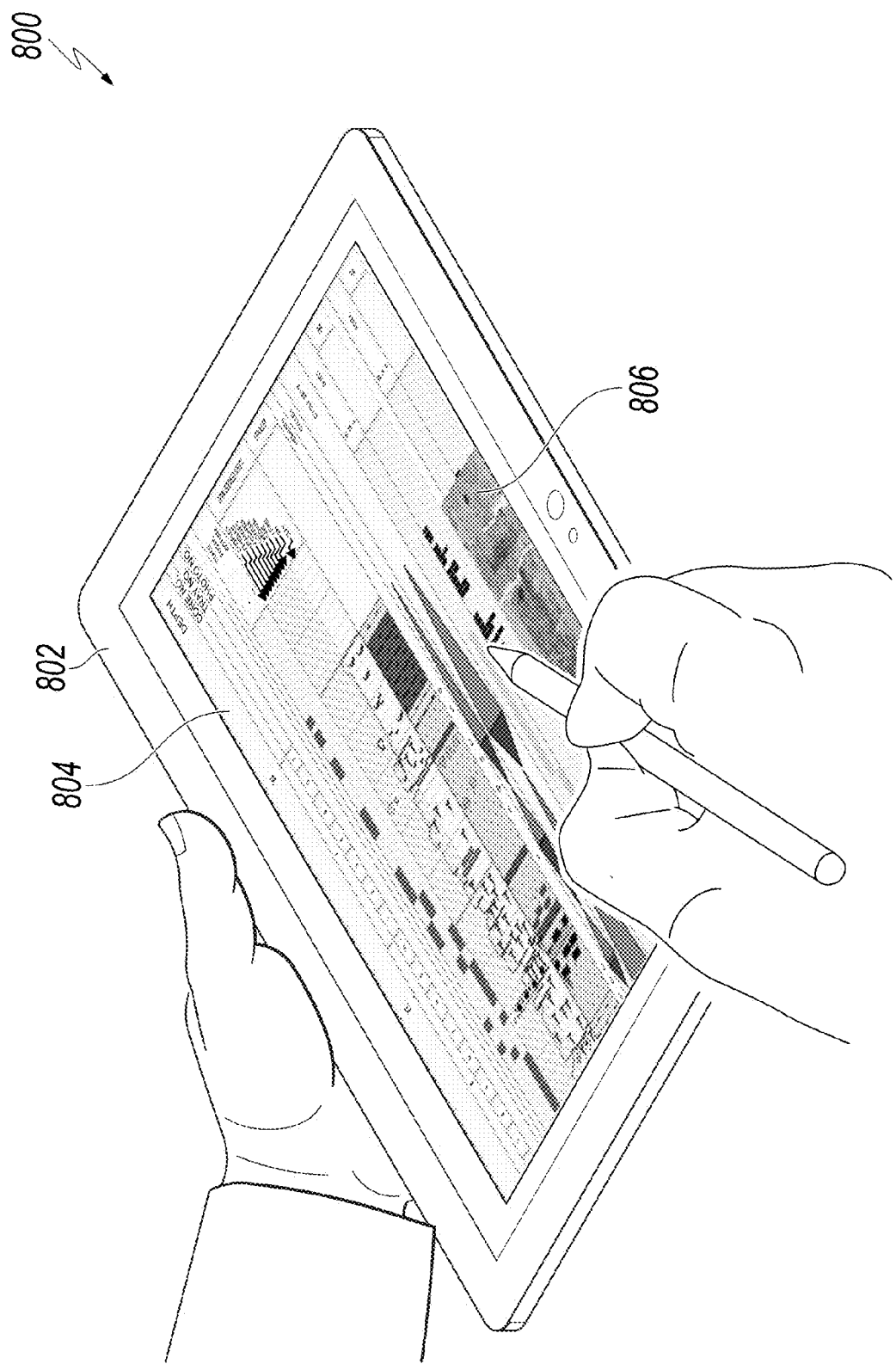
FIG. 8 illustrates the use of a mobile computing device application to digitally interpret well core data, according to an implementation of the present disclosure.

FIG. 8 illustrates the use of a mobile computing device application 800 to digitally interpret well core data, according to an implementation of the present disclosure. For example, mobile computing device 802 is shown executing an application 804 that permits a user to digitally-interpret (for example, draw, annotate, drag and drop, pan and zoom, and write on with a stylus, finger, or pointer) rendered well core visual data 806 related to a well core (for example, using lines, symbols, or text). In some implementations, this added information can be treated as metadata and be stored with the rendered image in image headers or in some other data storage location. The user can select from the previously-described standard drawings, names, and database code information (for example, using contextual graphical user interface menus) for use in marking up the rendered visual data. In some implementations, the application 804 can analyze the user's hand drawn symbols, text and markings and make suggestions consistent with standardized values. In some implementation, the user must make a selection to store particular data (particularly standard drawings, names, and database codes) with the visual data and in a database. Interpreted well core data forms a digital representation of the well core visual data 806a. Interpreted well core data can, in some instances, dynamically change to reflect entered interpretive criteria.

A well core is, for example 30-200 feet, of rock extracted from a single well. In FIG. 8, user is shown using a tablet-type computer to describe various observed features. Each observation can be considered a single data point in a database. For example, if many user interpreted observations/interpretations are performed by the user using the tablet-type computer in FIG. 8, the observation/interpretations make up multiple data points in the database. In a fossil track, fossil symbols can be dragged to the proper depth when we a fossil in noticed in a core image. For example, three occurrences of a fossil BU7 is spotted (such as, at a depth of 5070 feet, 5120 feet, and 5215 feet). Each occurrence is a single data point. Each data point also has multiple attributes (for example, well name, X- and Y-coordinate, fossil code BU7, and depth). Similarly, there can be data points for fossil BU 11, BU 15, or another fossil. There are also multiple tracks for different feature categories. For example another track—Grain Size. Many data points will have the multiple attributes (for example, well name, X- and Y-coordinates, Grain Size, and depth). All the single data points form many multiple data points updated in the database.

Figure 9:
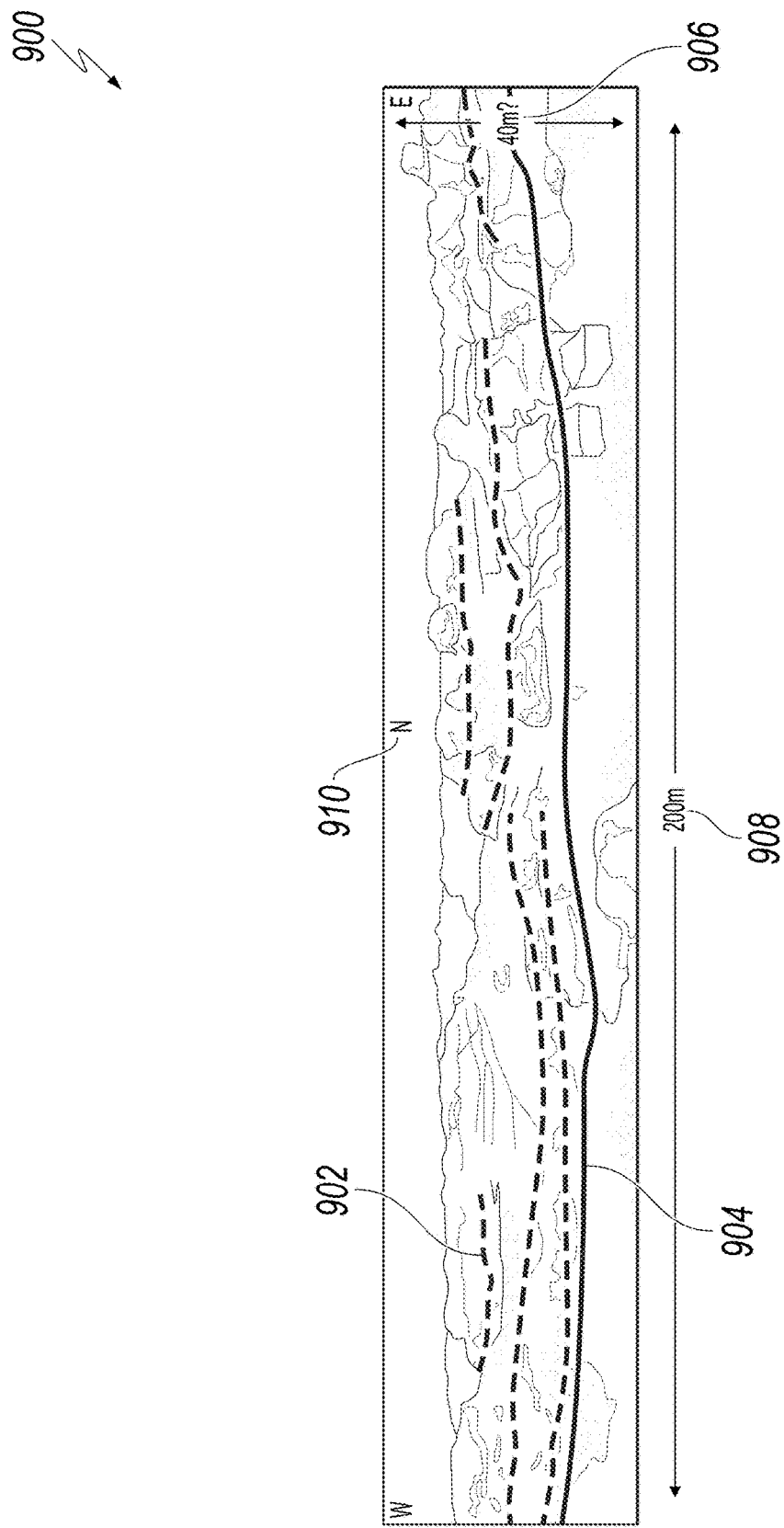
FIG. 9 illustrates an example biostratigraphy-interpreted rock outcrop digital photograph with reservoir contact and boundary interpretive notations according to an implementation of the present disclosure.

FIG. 9 illustrates an example biostratigraphy-interpreted rock outcrop digital photograph 900 with reservoir contact and boundary interpretive notations according to an implementation of the present disclosure. For example, FIG. 9 can represent a digital visualization of a rock outcrop discovered by a geoscientist at a particular geographic location associated with a set of well locations. Biostratigraphy-interpreted digital photograph 900 includes example interpretive notations 902 and 904. The interpretive notations 902 and 904 are the locations of observed rock outcrop features. For example, notation 902 can be a curve representing a location of a first reservoir contact/boundary, and notation 904 can be a curve representing the location of a second contact/reservoir boundary. Multiple notations can be made on the digital photograph 900. Each notation can have different properties (for example, line color, line thickness, and annotations) to represent individual notations, certain types of notations (for example, boundary, contact, and reservoir type), or certain characteristics of a particular feature(s) (for example, color, composition, depth, and paleo-fossil content). For example, digital photograph 900 was annotated with a question 906 of the depth of the imaged rock outcrop (here, "40 m?") and a note 908 with respect to the length of the imaged rock outcrop (here, "200 m"). The properties of a notation can be modified during image interpretation. In some implementations, each notation can be associated with a well core. In some implementations, notations on multiple photographs can be associated, for example, if the notations represent the same reservoir contact feature spanning multiple digital photographs. In some implementations, the actual surface location of a noted feature can be generated from one or more photographs and associated information (such as, GPS/geospatial coordinates, elevation, cardinal directions, spatial measurements, and optical properties of the camera). For example, digital photograph 900 has been annotated with cardinal directions 910 (here, "W," "N,", and "E"). In some implementations, each notation can be associated with particular attributes (for example, GPS/geospatial coordinates, elevation, and spatial measurements).

Similar to FIG. 8, in some implementations, added notations can be treated as metadata and be stored with the digital photograph in image headers or in some other data storage location associated with the digital photograph. The user can select from the previously-described standard drawings, names, and database code information (for example, using contextual graphical user interface menus) for use in marking up the rendered visual data. In some implementations, the application rendering the digital photograph 900 (for example, application 804 in FIG. 8) can analyze the user's hand drawn symbols, text and markings and make suggestions consistent with standardized values. In some implementation, the user must make a selection to store particular data (particularly standard drawings, names, and database codes) with the visual data and in a database. Interpreted rock outcrop data forms a digital representation of one or more rock outcrop digital photographs. An biostratigraphy-interpreted rock outcrop digital photograph (for example, 900) can, in some instances, dynamically change to reflect entered interpretive criteria (for example, to incorporate standard drawings, names, and database code information as opposed to hand-drawn information).

The biostratigraphy-interpreted rock outcrop digital photograph 900 can be cross-checked against paleo-fossil identification in one or more exploration well cores. This cross-checking can add insight to, for example, bio-steering of and real-time well drilling.

Figure 10:
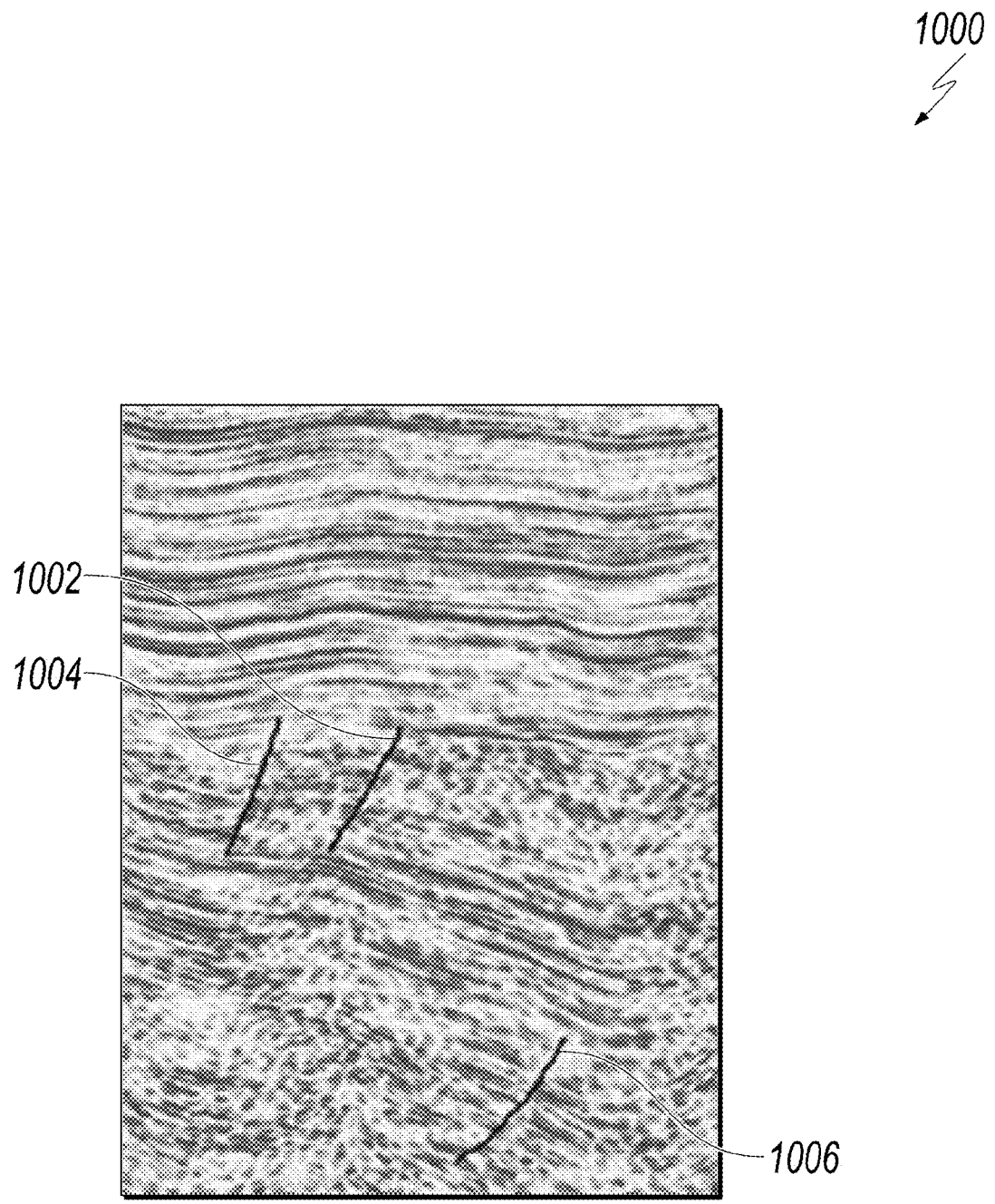
FIG. 10 is an illustration of an example conventional seismic data plot to illustrate proposed faults and fractures, according to an implementation of the present disclosure.

FIG. 10 is an illustration of an example conventional seismic data plot 1002 to illustrate proposed faults and fractures, according to an implementation of the present disclosure. For example, the seismic data plot 1002 is two-dimensional (2D) in nature and illustrates three proposed faults and fractures 1002, 1004, and 1006. As previously-mentioned, seismic wave processing typically selects breaks in seismic signal continuity and treats the selections as faults. However, breaks can come from many other non-fault factors, (such as, non-functional recording equipment and road noise). As a result, interpretation based on seismic wave processing can be vague and non-conclusive.

Figure 11:
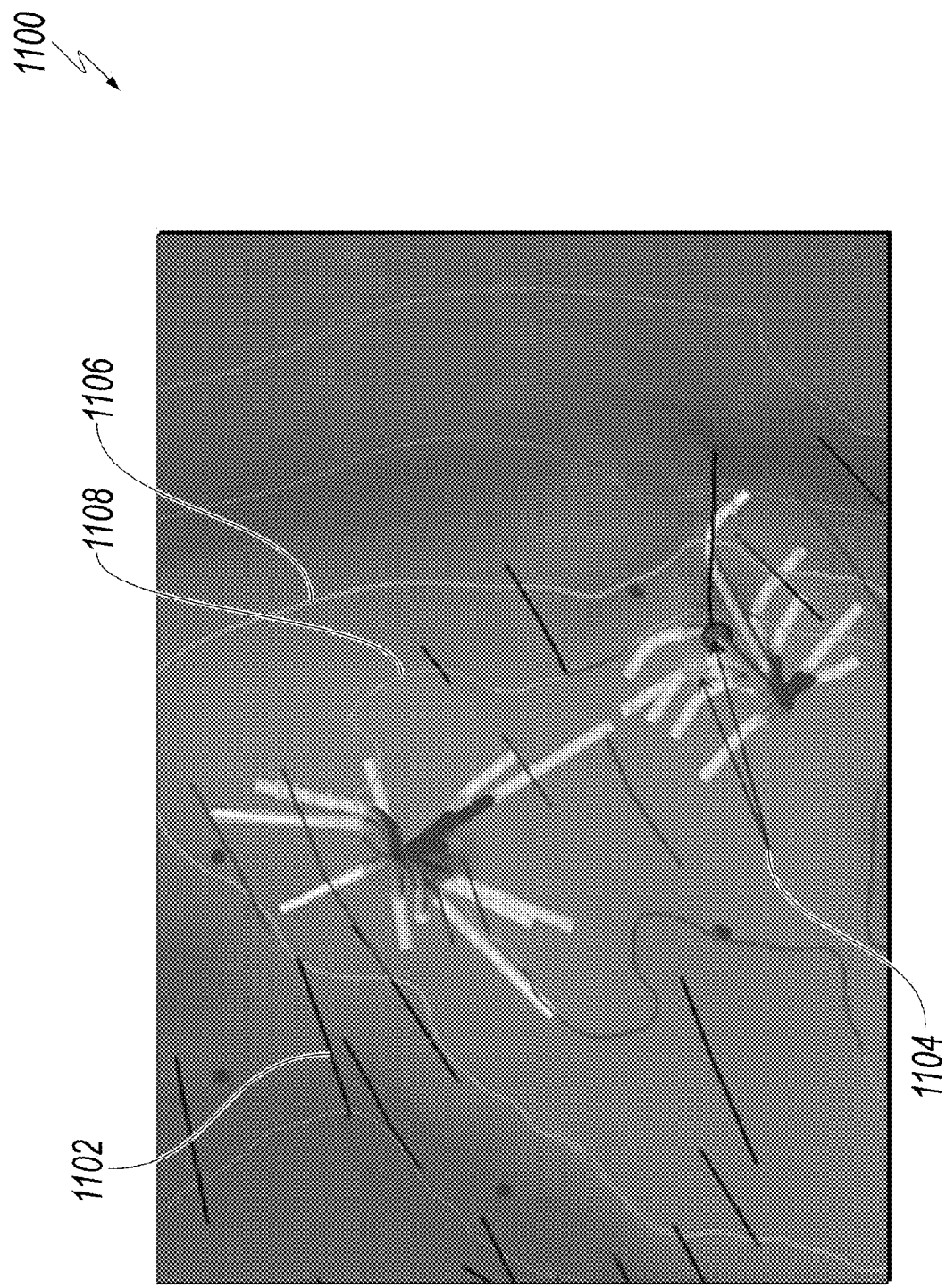
FIG. 11 is an example visualization of a 3D distribution of faults and fractures from sedimentary structure, according to an implementation of the present disclosure.

FIG. 11 is an example visualization 1100 of a 3D distribution of faults and fractures from sedimentary structure, according to an implementation of the present disclosure. Sedimentary structure can be described and interpreted with respect to well core data to provide a good indication of the presence of a sedimentary fault and fracture. For example, with a large amount of stylolite and fracture data in a database with standard codes and associated well-location and depth, 3D distribution of the fault and fracture can be generated and visualized. The described approach examines the faults from actual core samples extracted thousands of feet below the surface and interpreted from actual hard data in the depth domain, instead of using seismic reflection soft data from a time domain. As a result, the described approach can provide a ground truth calibration to fault and fracture interpretation traditionally provided following processing of reflected seismic wave signals.

FIG. 11 presents a visualized 3D distribution of fracture lineaments 1102, mud loss points 1104, oil-water contact 1106, and gas-oil contact 1108. Compared to the visualization of FIG. 10, it is clear that FIG. 11 is much more analytically-intuitive and provides additional contextual data (due to the 3D nature of the visualization) with respect to at least the fracture lineaments 1102 and other elements of the visualization 1100.

Figure 12:
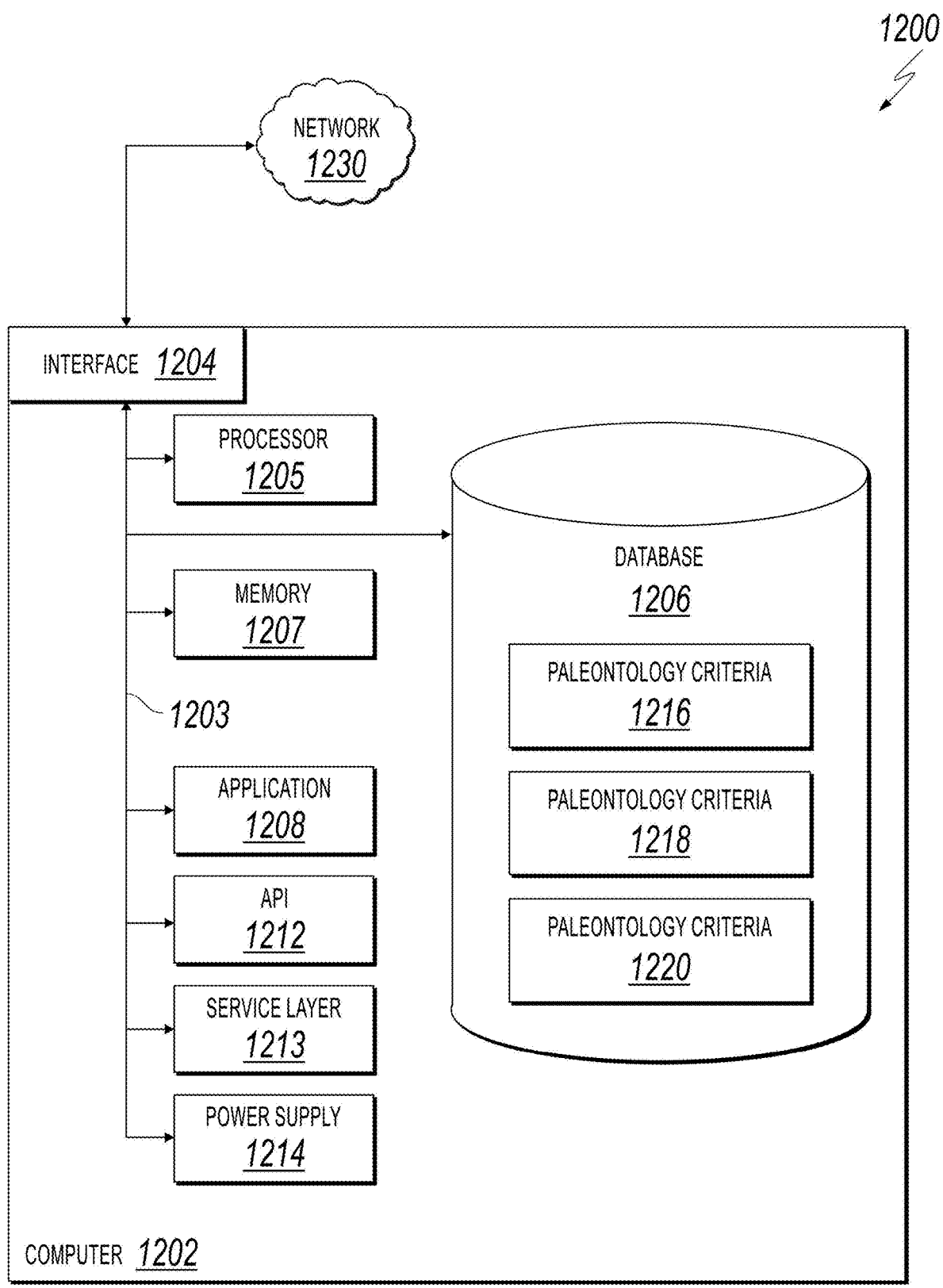
FIG. 12 is a block diagram illustrating an example computer system used to provide computational functionalities associated with described algorithms, methods, functions, processes, flows, and procedures as described in the instant disclosure, according to an implementation of the present disclosure.

FIG. 12 is a block diagram of an example computer system 1200 used to provide computational functionalities associated with described algorithms, methods, functions, processes, flows, and procedures, as described in the instant disclosure, according to an implementation. The illustrated computer 1202 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 1202 may comprise a computer that includes an input device, such as a keypad, keyboard, touch screen, or other device that can accept user information, and an output device that conveys information associated with the operation of the computer 1202, including digital data, visual, or audio information (or a combination of information), or a graphical-type user interface (UI) (or GUI).

The computer 1202 can serve in a role as a client, network component, a server, a database or other persistency, or any other component (or a combination of roles) of a computer system for performing the subject matter described in the instant disclosure. The illustrated computer 1202 is communicably coupled with a network 1230. In some implementations, one or more components of the computer 1202 may be configured to operate within environments, including cloud-computing-based, local, global, or other environment (or a combination of environments).

At a high level, the computer 1202 is an electronic computing device operable to receive, transmit, process, store, or manage data and information associated with the described subject matter. According to some implementations, the computer 1202 may also include or be communicably coupled with an application server, e-mail server, web server, caching server, streaming data server, or other server (or a combination of servers).

The computer 1202 can receive requests over network 1230 from a client application (for example, executing on another computer 1202) and respond to the received requests by processing the received requests using an appropriate software application(s). In addition, requests may also be sent to the computer 1202 from internal users (for example, from a command console or by other appropriate access method), external or third-parties, other automated applications, as well as any other appropriate entities, individuals, systems, or computers.

Each of the components of the computer 1202 can communicate using a system bus 1203. In some implementations, any or all of the components of the computer 1202, hardware or software (or a combination of both hardware and software), may interface with each other or the interface 1204 (or a combination of both), over the system bus 1203 using an application programming interface (API) 1212 or a service layer 1213 (or a combination of the API 1212 and service layer 1213). The API 1212 may include specifications for routines, data structures, and object classes. The API 1212 may be either computer-language independent or dependent and refer to a complete interface, a single function, or even a set of APIs. The service layer 1213 provides software services to the computer 1202 or other components (whether or not illustrated) that are communicably coupled to the computer 1202. The functionality of the computer 1202 may be accessible for all service consumers using this service layer. Software services, such as those provided by the service layer 1213, provide reusable, defined functionalities through a defined interface. For example, the interface may be software written in JAVA, C++, or other suitable language providing data in extensible markup language (XML) format or other suitable format. While illustrated as an integrated component of the computer 1202, alternative implementations may illustrate the API 1212 or the service layer 1213 as stand-alone components in relation to other components of the computer 1202 or other components (whether or not illustrated) that are communicably coupled to the computer 1202. Moreover, any or all parts of the API 1212 or the service layer 1213 may be implemented as child or sub-modules of another software module, enterprise application, or hardware module without departing from the scope of this disclosure.

The computer 1202 includes an interface 1204. Although illustrated as a single interface 1204 in FIG. 12, two or more interfaces 1204 may be used according to particular needs, desires, or particular implementations of the computer 1202. The interface 1204 is used by the computer 1202 for communicating with other systems that are connected to the network 1230 (whether illustrated or not) in a distributed environment. Generally, the interface 1204 comprises logic encoded in software or hardware (or a combination of software and hardware) and is operable to communicate with the network 1230. More specifically, the interface 1204 may comprise software supporting one or more communication protocols associated with communications such that the network 1230 or interface's hardware is operable to communicate physical signals within and outside of the illustrated computer 1202.

The computer 1202 includes a processor 1205. Although illustrated as a single processor 1205 in FIG. 12, two or more processors may be used according to particular needs, desires, or particular implementations of the computer 1202. Generally, the processor 1205 executes instructions and manipulates data to perform the operations of the computer 1202 and any algorithms, methods, functions, processes, flows, and procedures as described in the instant disclosure.

The computer 1202 also includes a database 1206 that can hold data for the computer 1202 or other components (or a combination of both) that can be connected to the network 1230 (whether illustrated or not). For example, database 1206 can be an in-memory, conventional, or other type of database storing data consistent with this disclosure. In some implementations, database 1206 can be a combination of two or more different database types (for example, a hybrid in-memory and conventional database) according to particular needs, desires, or particular implementations of the computer 1202 and the described functionality. Although illustrated as a single database 1206 in FIG. 12, two or more databases (of the same or combination of types) can be used according to particular needs, desires, or particular implementations of the computer 1202 and the described functionality. While database 1206 is illustrated as an integral component of the computer 1202, in alternative implementations, database 1206 can be external to the computer 1202. As illustrated, the database 1206 holds previously described data types Paleontology Criteria 1216, Geological Interpretation 1218, and Big Data 1220.

The described approach incorporates a unique multi-dimensional paleo-fossil database schema. Each observation and description has a measured depth along the wellbore recorded in the database. In some implementations, the paleo-fossil schema includes multiple categories and standards. For example, in some implementations, fossil identification, structures, and lithology are included which are divided and standardized into multiple categories (such as, Bedding—B and Cross-Bedding—XB).

In some implementations, the paleo-fossil schema also includes unique symbol codes in the database. For example, in some implementations, each particular identified fossil, structure, and lithology are uniquely identified (for example, using a unique name, drawing, and database code) in the database. A respective family code is also embedded with respect to the unique codes. For example, and in some implementations, with fifteen or more categories (such as, BU and B in FIGS. 2A and 2B), within each category, there can be fifteen or more variations. Accordingly, each unique item can be identified as BU1, BU 2, BU3, . . . , BUn; B1, B2, B3, . . . , Bn; or XB1, XB2, XB3, . . . , XBn. A unique database core (for BU1, BU2, BU3, . . . , BUn, etc.) fixed description name, and standard drawing image are specified and coded for each database record.

In some implementations, additional interpretive codes (qualifiers) can exist. For example, with respect to the P (Primary) code, a code S (Secondary) can also exist. These additional codes can add additional sophistication to interpretation efforts. For example, two types of paleo-fossils can be noted and recorded with standard codes. With additional codes, one type of the paleo-fossils can be indicated as a Primary (more abundant), while the other type of fossil can be indicated as Secondary (less abundant). When a paleo-fossil is observed, a presence code is recorded in the database. Furthermore, an additional abundance quantifier is also recorded in the database detailing a value representing the abundance of the paleo-fossil in the observation. For example, in some implementations, the abundance value can vary from 1 to 5 (with 1 meaning rarely seen and 5 meaning occurring abundantly). In other implementations, the abundance value can be any range of values consistent with this disclosure.

Typical implementations of the paleo-fossil schema records the well name with respect to any data interpretations made. Additional data with respect to data interpretations can be stored in a well geometry schema. In some implementations, data recorded in the well geometry schema can include well name, X/Y-coordinates, Z-trajectories, Kelly Bushing (by which depth measurements are referenced) identification, or other data consistent with this disclosure.

Big data calibration is enabled by the described database at least because the paleo-fossil schema contains substantive technical interpretations, the well geometry schema contains wellbore trajectory information in 3D, the well name present in both schemas provides a key value to link the two schemas, and by correlating the two schemas in the database, each paleo-fossil database point can be placed properly in a 3D space within the earth. With millions of data points in the database that are both paleontologically and geospatially correct, the described approach permits correlation, extrapolation, and 3D gridding digital techniques to be applied to yield unique 3D trend data (for example, 414 in FIG. 4). This type of data processing has not been possible prior to the described approach, at least because prior manual processes generated too few and scattered manual observational data points, the described database and associated schemas did not exist to properly store and correlate the described observational data points, and the described big data analytics were not available to process the stored observational data points in any reasonable amount of time.

The computer 1202 also includes a memory 1207 that can hold data for the computer 1202 or other components (or a combination of both) that can be connected to the network 1230 (whether illustrated or not). Memory 1207 can store any data consistent with this disclosure. In some implementations, memory 1207 can be a combination of two or more different types of memory (for example, a combination of semiconductor and magnetic storage) according to particular needs, desires, or particular implementations of the computer 1202 and the described functionality. Although illustrated as a single memory 1207 in FIG. 12, two or more memories 1207 (of the same or combination of types) can be used according to particular needs, desires, or particular implementations of the computer 1202 and the described functionality. While memory 1207 is illustrated as an integral component of the computer 1202, in alternative implementations, memory 1207 can be external to the computer 1202.

The application 1208 is an algorithmic software engine providing functionality according to particular needs, desires, or particular implementations of the computer 1202, particularly with respect to functionality described in this disclosure. For example, application 1208 can serve as one or more components, modules, or applications. Further, although illustrated as a single application 1208, the application 1208 may be implemented as multiple applications 1208 on the computer 1202. In addition, although illustrated as integral to the computer 1202, in alternative implementations, the application 1208 can be external to the computer 1202.

For example, the application 1208 can include some or all of the described data mining/analytics functionality associated with the described big data functionality. The big data functionality can include any custom, commercial, open source, or other processing engine for performing the big-data-type operations described or consistent with this disclosure. For example, the application 1208 can include pattern matching, artificial intelligence, trend analysis, and other analytic-type functions.

In some implementations, a master control program/script can be configured to perform one or operations of the described approach. For example, the master control program/script can be configured to perform one or more of: 1) mine big data with respect to a specific paleo-fossil database code; 2) identify a well name associated with each find (Z); 3) cross-check the well database to provide well X, Y coordinates with the well name of each find; 4) consolidate multiple X,Y,Z records; 5) use a custom or available gridding algorithm to generate a 3D biostratigraphy grid; and 6) use a custom or available visualization application to render and to display the 3D biostratigraphy grid for analysis or use in further operations (for example, bio-steering or real-time drilling control). As another example, with the interpretation of a sedimentary structure (such as, fault and fracture), an advance warning can be generated for drilling operations from a prediction of a drilling mud loss area (or any other data/value consistent with this disclosure). Using the generated warning, a computer-implemented, real-time drilling system can directly influence/control the action of a hydrocarbon recovery drill and associated equipment. For example, if a warning is raised, the real-time drilling system can redirect, stop, or slow the drill.

The computer 1202 can also include a power supply 1214. The power supply 1214 can include a rechargeable or non-rechargeable battery that can be configured to be either user- or non-user-replaceable. In some implementations, the power supply 1214 can include power-conversion or management circuits (including recharging, standby, or other power management functionality). In some implementations, the power-supply 1214 can include a power plug to allow the computer 1202 to be plugged into a wall socket or other power source to, for example, power the computer 1202 or recharge a rechargeable battery.

There may be any number of computers 1202 associated with, or external to, a computer system containing computer 1202, each computer 1202 communicating over network 1230. Further, the term "client," "user," and other appropriate terminology may be used interchangeably, as appropriate, without departing from the scope of this disclosure. Moreover, this disclosure contemplates that many users may use one computer 1202, or that one user may use multiple computers 1202.

Described implementations of the subject matter can include one or more features, alone or in combination.

For example, in a first implementation, a computer-implemented method, comprising: generating a dataset in a database using standardized paleo-fossil and sedimentary information; executing analytical operations on the generated dataset; determining a reservoir zone thickness of a stratigraphic zone based on a result of the analytical operations, wherein the analytical operations determine a starting occurrence and an ending occurrence of a one or more particular paleo-fossils, and wherein the starting occurrence and ending occurrence is used to define boundaries of the stratigraphic zone and to determine the reservoir zone thickness; performing a fault and fracture analysis based on a result of the analytical operations; controlling, in real-time, at least one action of a hydrocarbon recovery drill, wherein control of the at least one action is based upon geological datum and the determined reservoir zone thickness or predictions based on the result of the fault and fracture analysis.

The foregoing and other described implementations can each, optionally, include one or more of the following features:

A first feature, combinable with any of the following features, further comprising integrating standardized paleo-fossil and sedimentary information into a software application to permit digital interpretation of well core data and sedimentary data with a graphical user interface on a mobile computing device.

A second feature, combinable with any of the previous or following features, wherein the analytical operations include paleontological criteria modeling paleontological theories and geological interpretations.

A third feature, combinable with any of the previous or following features, further comprising predicting instability zones of a wellbore before drilling with the hydrocarbon recovery drill.

A fourth feature, combinable with any of the previous or following features, further comprising predicting the loss of drilling mud based on the result of the fault and fracture analysis.

A fifth feature, combinable with any of the previous or following features, further comprising crosschecking the determined reservoir zone thickness against paleo-fossil identifications and the geological datum to control steering of the hydrocarbon recovery drill based on the determined reservoir zone thickness.

A sixth feature, combinable with any of the previous or following features, further comprising continuously updating the generated dataset based on additionally-received data, updates to standardized paleo-fossil and sedimentary information, or schema changes to the database.

In a second implementation, a non-transitory, computer-readable medium storing one or more instructions executable by a computer system to perform operations comprising: generating a dataset in a database using standardized paleo-fossil and sedimentary information; executing analytical operations on the generated dataset; determining a reservoir zone thickness of a stratigraphic zone based on a result of the analytical operations, wherein the analytical operations determine a starting occurrence and an ending occurrence of a one or more particular paleo-fossils, and wherein the starting occurrence and ending occurrence is used to define boundaries of the stratigraphic zone and to determine the reservoir zone thickness; performing a fault and fracture analysis based on a result of the analytical operations; controlling, in real-time, at least one action of a hydrocarbon recovery drill, wherein control of the at least one action is based upon geological datum and the determined reservoir zone thickness or predictions based on the result of the fault and fracture analysis.

The foregoing and other described implementations can each, optionally, include one or more of the following features:

A first feature, combinable with any of the following features, further comprising one or more instructions to integrate standardized paleo-fossil and sedimentary information into a software application to permit digital interpretation of well core data and sedimentary data with a graphical user interface on a mobile computing device.

A second feature, combinable with any of the previous or following features, wherein the analytical operations include paleontological criteria modeling paleontological theories and geological interpretations.

A third feature, combinable with any of the previous or following features, further comprising one or more instructions to predict instability zones of a wellbore before drilling with the hydrocarbon recovery drill.

A fourth feature, combinable with any of the previous or following features, further comprising one or more instructions to predict the loss of drilling mud based on the result of the fault and fracture analysis.

A fifth feature, combinable with any of the previous or following features, further comprising one or more instructions to crosscheck the determined reservoir zone thickness against paleo-fossil identifications and the geological datum to control steering of the hydrocarbon recovery drill based on the determined reservoir zone thickness.

A sixth feature, combinable with any of the previous or following features, further comprising one or more instructions to continuously update the generated dataset based on additionally-received data, updates to standardized paleo-fossil and sedimentary information, or schema changes to the database.

In a third implementation, a computer-implemented system, comprising: one or more computers; and one or more computer memory devices interoperably coupled with the one or more computers and having tangible, non-transitory, machine-readable media storing instructions that, when executed by the one or more computers, perform one or more operations comprising: generating a dataset in a database using standardized paleo-fossil and sedimentary information; executing analytical operations on the generated dataset; determining a reservoir zone thickness of a stratigraphic zone based on a result of the analytical operations, wherein the analytical operations determine a starting occurrence and an ending occurrence of a one or more particular paleo-fossils, and wherein the starting occurrence and ending occurrence is used to define boundaries of the stratigraphic zone and to determine the reservoir zone thickness; performing a fault and fracture analysis based on a result of the analytical operations; controlling, in real-time, at least one action of a hydrocarbon recovery drill, wherein control of the at least one action is based upon geological datum and the determined reservoir zone thickness or predictions based on the result of the fault and fracture analysis.

The foregoing and other described implementations can each, optionally, include one or more of the following features:

A first feature, combinable with any of the following features, further comprising one or more operations to integrate standardized paleo-fossil and sedimentary information into a software application to permit digital interpretation of well core data and sedimentary data with a graphical user interface on a mobile computing device.

A second feature, combinable with any of the previous or following features, wherein the analytical operations include paleontological criteria modeling paleontological theories and geological interpretations.

A third feature, combinable with any of the previous or following features, further comprising one or more operations to predict instability zones of a wellbore before drilling with the hydrocarbon recovery drill.

A fourth feature, combinable with any of the previous or following features, further comprising one or more operations to predict the loss of drilling mud based on the result of the fault and fracture analysis.

A fifth feature, combinable with any of the previous or following features, further comprising one or more operations to crosscheck the determined reservoir zone thickness against paleo-fossil identifications and the geological datum to control steering of the hydrocarbon recovery drill based on the determined reservoir zone thickness.

A sixth feature, combinable with any of the previous or following features, further comprising one or more operations to continuously update the generated dataset based on additionally-received data, updates to standardized paleo-fossil and sedimentary information, or schema changes to the database.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., or less than 5 secs. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data includes all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital video disc (DVD), CD-ROM, DVD+/-R, DVD-RAM, DVD-ROM, HD-DVD, and BLURAY, and other optical memory technologies. The memory may store various objects or data, including caches, classes, frameworks, applications, modules, backup data, jobs, web pages, web page templates, data structures, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   generating a dataset in a database using standardized paleo-fossil and sedimentary information;
   executing analytical operations on the generated dataset;
   determining a reservoir zone thickness of a stratigraphic zone based on a result of the analytical operations, wherein the analytical operations determine a starting occurrence and an ending occurrence of a one or more particular paleo-fossils, and wherein the reservoir zone thickness represents a difference between a depth corresponding to the starting occurrence and another depth corresponding to the ending occurrence;
   performing a fault and fracture analysis based on a result of the analytical operations; and
   controlling, in real-time, at least one action of a hydrocarbon recovery drill, wherein control of the at least one action is based upon geological datum and the determined reservoir zone thickness or predictions based on the result of the fault and fracture analysis.

2. The computer-implemented method of claim 1, further comprising integrating standardized paleo-fossil and sedimentary information into a software application to permit digital interpretation of well core data and sedimentary data with a graphical user interface on a mobile computing device.

3. The computer-implemented method of claim 1, wherein the analytical operations include paleontological criteria modeling paleontological theories and geological interpretations.

4. The computer-implemented method of claim 1, further comprising predicting instability zones of a wellbore before drilling with the hydrocarbon recovery drill.

5. The computer-implemented method of claim 1, further comprising predicting a loss of drilling mud based on the result of the fault and fracture analysis.

6. The computer-implemented method of claim 1, further comprising crosschecking the determined reservoir zone thickness against paleo-fossil identifications and the geological datum to control steering of the hydrocarbon recovery drill based on the determined reservoir zone thickness.

7. The computer-implemented method of claim 1, further comprising continuously updating the generated dataset based on additionally-received data, updates to standardized paleo-fossil and sedimentary information, or schema changes to the database.

8. A non-transitory, computer-readable medium storing one or more instructions executable by a computer system to perform operations comprising:
   generating a dataset in a database using standardized paleo-fossil and sedimentary information;
   executing analytical operations on the generated dataset;
   determining a reservoir zone thickness of a stratigraphic zone based on a result of the analytical operations, wherein the analytical operations determine a starting occurrence and an ending occurrence of a one or more particular paleo-fossils, and wherein the reservoir zone thickness represents a difference between a depth corresponding to the starting occurrence and another depth corresponding to the ending occurrence;
   performing a fault and fracture analysis based on a result of the analytical operations; and
   controlling, in real-time, at least one action of a hydrocarbon recovery drill, wherein control of the at least one action is based upon geological datum and the determined reservoir zone thickness or predictions based on the result of the fault and fracture analysis.

9. The non-transitory, computer-readable medium of claim 8, further comprising one or more instructions to integrate standardized paleo-fossil and sedimentary information into a software application to permit digital interpretation of well core data and sedimentary data with a graphical user interface on a mobile computing device.

10. The non-transitory, computer-readable medium of claim 8, wherein the analytical operations include paleontological criteria modeling paleontological theories and geological interpretations.

11. The non-transitory, computer-readable medium of claim 8, further comprising one or more instructions to predict instability zones of a wellbore before drilling with the hydrocarbon recovery drill.

12. The non-transitory, computer-readable medium of claim 8, further comprising one or more instructions to predict a loss of drilling mud based on the result of the fault and fracture analysis.

13. The non-transitory, computer-readable medium of claim 8, further comprising one or more instructions to crosscheck the determined reservoir zone thickness against paleo-fossil identifications and the geological datum to control steering of the hydrocarbon recovery drill based on the determined reservoir zone thickness.

14. The non-transitory, computer-readable medium of claim 8, further comprising one or more instructions to continuously update the generated dataset based on additionally-received data, updates to standardized paleo-fossil and sedimentary information, or schema changes to the database.

15. A computer-implemented system, comprising:
   one or more computers; and
   one or more computer memory devices interoperably coupled with the one or more computers and having tangible, non-transitory, machine-readable media storing instructions that, when executed by the one or more computers, perform one or more operations comprising:
   generating a dataset in a database using standardized paleo-fossil and sedimentary information;
   executing analytical operations on the generated dataset;
   determining a reservoir zone thickness of a stratigraphic zone based on a result of the analytical operations, wherein the analytical operations determine a starting occurrence and an ending occurrence of a one or more particular paleo-fossils, and wherein the reservoir zone thickness represents a difference between a depth corresponding to the starting occurrence and another depth corresponding to the ending occurrence;
   performing a fault and fracture analysis based on a result of the analytical operations; and
   controlling, in real-time, at least one action of a hydrocarbon recovery drill, wherein control of the at least one action is based upon geological datum and the determined reservoir zone thickness or predictions based on the result of the fault and fracture analysis.

16. The computer-implemented system of claim 15, wherein the one or more operations further comprise integrating standardized paleo-fossil and sedimentary information into a software application to permit digital interpretation of well core data and sedimentary data with a graphical user interface on a mobile computing device.

17. The computer-implemented system of claim 15, wherein the analytical operations include paleontological criteria modeling paleontological theories and geological interpretations.

18. The computer-implemented system of claim 15, wherein the one or more operations further comprise:
   predicting instability zones of a wellbore before drilling with the hydrocarbon recovery drill; and
   predicting a loss of drilling mud based on the result of the fault and fracture analysis.

19. The computer-implemented system of claim 15, wherein the one or more operations further comprise crosschecking the determined reservoir zone thickness against paleo-fossil identifications and the geological datum to control steering of the hydrocarbon recovery drill based on the determined reservoir zone thickness.

20. The computer-implemented system of claim 15, wherein the one or more operations further comprise continuously updating the generated dataset based on additionally-received data, updates to standardized paleo-fossil and sedimentary information, or schema changes to the database.

* * * * *